United States Patent Office 3,705,005
Patented Dec. 5, 1972

3,705,005
AMINOALKYLENE PHOSPHONATE DERIVATIVES AS CORROSION INHIBITORS IN AQUEOUS SYSTEMS
Frank R. Cervi, Feasterville, Pa., and Richard G. Tonkyn, Frenchtown, N.J., assignors to Betz Laboratories, Inc., Trevose, Pa.
No Drawing. Filed June 21, 1971, Ser. No. 155,303
Int. Cl. C23f 11/16
U.S. Cl. 21—2.7                                     11 Claims

ABSTRACT OF THE DISCLOSURE

Aminoalkylene phosphonates containing sulfur, oxygen, sulfoxide or sulfone groups and their use as corrosion inhibitors in aqueous systems. It has been discovered that compounds of this nature not only yield satisfactory anodic inhibition, but also very desirable cathodic corrosion inhibition when added to aqueous systems in an effective amount, e.g. ranging from 1 to 1000 parts per million parts by weight of the aqueous system.

BACKGROUND OF THE INVENTION

The uses of aminophosphonic acid derivatives as corrosion inhibitors and scale inhibiting agents are well known as illustrated by U.S. Patents 3,510,436 and 3,547,817. Although not fully understood at the time of the filing of the application which issued as U.S. Patent 3,510,436, industrial systems treated with, for example, 100 parts per million of amino tri(methylene phosphonic acid) or its water-soluble salts, although showing overall good corrosion control also exhibited a specific type of corrosion which cannot be tolerated for any extensive period of time. This particular type corrosion is referred to as "pitting" which is due to a localized corrosion condition. As can be appreciated, although a particular metal system immersed in or conveying an aqueous medium may show an acceptable annual corrosion rate, this corrosion rate may in fact be unsatisfactory because essentially all the corrosion has taken place at specific and only at certain locations. Corrosion of this nature will obviously result in a weak spot in the metallic structure which, of course, would require the earlier than normal repair or replacement of the respective parts. The electromotive principles of the corrosion of metals in an aqueous system, i.e. anodic and cathodic corrosion, are well known as established by, for example, the Betz Handbook of Industrial Water Conditioning, 6th Edition, 1962, pp. 258–278.

With the present emphasis upon pollution abatement and the preservation of ecological strains, certain chemicals, although quite effective as corrosion inhibitors, are under great scrutiny in the industrial water treatment field. This is the case since the Federal Government and the municipal governments consider many of these chemicals or their constituents to be pollutants and a detriment to the ecological systems. Accordingly, certain prohibitions were legislated to control the discharge of effluents into natural water bodies, and, in particular, to control industrial discharges to these waters. As a consequence, effluent treatment equipment and systems had to be established at great expense to the particular facility to insure that the quality of the discharge met with the legislative mandates.

In view of the current situation then, industrial concerns are seeking industrial water treatment chemicals which will not only perform effectively in minimizing corrosion, but also chemicals which preferably must require little or no treatment before disposal. Obviously, then these chemicals must have little or no effect on marine life.

The amino tri(lower alkylidine phosphonic acid) compounds described in the patents referred to earlier possess this capacity, i.e. they are not particularly toxic to fish. However, as earlier disclosed, the aminophosphonic acid derivatives were not particularly effective under corrosion conditions normally found in industrial water systems, such as cooling water systems, because they were not effective as cathodic inhibitors. Pitting resulted in the metal components of the system. When used in conjunction with well-known cathodic type inhibitors, these compounds were not acceptable since they adversely affected marine life and were considered to be pollutants and usually within legislative restrictions.

Accordingly, it was the present inventors' goal to synthesize compounds which were not only effective as overall corrosion inhibitors but also compounds which would be acceptable from the pollution and ecological standpoints.

GENERAL DESCRIPTION OF THE INVENTION

The present inventors discovered that if a compound of the following formula were added to an aqueous system in an effective amount, i.e. from about 1 to about 1000 parts per million (p.p.m.) and preferably 25 to 200 p.p.m. by weight of the aqueous system, that the corrosion of the metal parts in contact therewith was controlled to an acceptable degree. The compound not only provided satisfactory "anodic" inhibition, but also excellent "cathodic" inhibition. Moreover, the compounds exhibited fish kill data slightly more desirable and accordingly more acceptable than their well-known closely related compounds. More importantly, the compounds exhibited substantially more effective overall corrosion control as compared to the said closely related compounds.

The compounds of the invention possess the formula

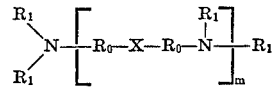

where X is S, $S_2$, SO, $SO_2$ or O;
where $R_0$ is selected from the group consisting of arylene, lower alkyl substituted arylene, halogenated arylene, sulfonated arylene and nitrated arylene (e.g. phenylene) and the group

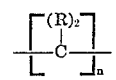

where R is selected from the group consisting of hydrogen and lower alkyls having from 1 to 6 carbon atoms, and $n$ is an integer of from 1 to 14;

where $R_1$ is selected from the group consisting of hydrogen, lower alkyl having from 1 to 6 carbon atoms, aryl and

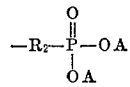

where $R_2$ is a lower alkylene or a lower alkyl substituted lower alkylene, and where A is an organic or inorganic cation; and where $m$ is an integer of from 1 to 10; with the proviso that at least $R_1$ is

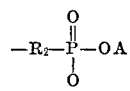

The lower alkyls of the formula which are represented by R and/or $R_1$ are exemplified by methyl, ethyl, propyl, butyl and hexyl. $R_1$ may also be aryl groups which can be represented by phenyl and substituted phenyls, such as benzyl, benzal, etc. The lower alkylenes which are represented by $R_2$ are the 1 to 6 carbon groups, such as methylene, propylene and hexylene. A of the formula as explained above may be any organic or inorganic cation which preferably is water soluble. Inorganic cations may be exemplified as the monovalent cations, such as the alkali metals, e.g. sodium, potassium, etc. and their equivalent ammonium and divalent cations, such as calcium, magnesium and zinc, etc. The organic cations may be exemplified by aliphatic or aromatic groups which are protonated by the phosphonic acid, e.g. triethylamine, pyridine, aniline, etc.

The compounds of the invention may be prepared by reacting a compound which may be described structurally and chemically by the formula

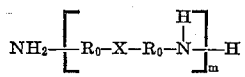

where X is S, $S_2$, SO, $SO_2$ or O;
where $R_0$ is selected from the group consisting of arylene, lower alkyl substituted arylene, halogenated arylene, sulfonated arylene and nitrated arylene (e.g. phenylene) and the group

where R is selected from the group consisting of hydrogen and lower alkyls having from 1 to 6 carbon atoms, and $n$ is an integer of from 1 to 14; with a phosphorous acid and an aldehyde in an acidic aqueous medium under refluxing conditions (temperature range of 85 to 110° F.), the reaction takes place over a period of hours (e.g. two to six hours) to insure the ultimate yield of the compound.

The reaction medium is concentrated and precipitated and the concentrate purified.

A subgeneric family of compounds which is particularly effective as corrosion inhibitors and scale inhibitors is that family illustrated by the general formula

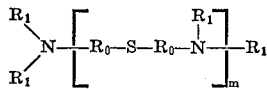

where $R_0$, $R_1$, $n$ and $m$ are as described in the generic formula.

As a preferred embodiment, all $R_1$'s would represent

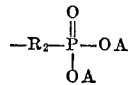

where $R_2$ is methylene and A represents hydrogen, an alkaline earth metal, an alkali metal, an ammonium cation or an organic cation; the R's are hydrogen; $n$ is an integer of from 1 to 3 and $m$ is an integer of from 1 to 4.

In order to establish the effectiveness of the generic concept of the invention as effective corrosion inhibitors in aqueous systems, the method of preparation and testing of a species under this concept is described below and the test data obtained is recorded in the following tables.

Example I

The compound prepared was bis(2,2'-diaminoethyl) sulfide tetra(methylene phosphonic acid).

The reaction whereby the compound is prepared is as follows:

$H_2N-CH_2CH_2-S-CH_2CH_2-NH_2 + 4CH_2O + 4HPO_3 \longrightarrow$

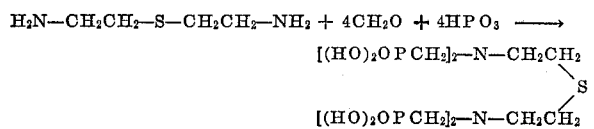

| Reactants | Weight (grams) | Mole |
|---|---|---|
| Bis(2-aminoethylsulfide) | 30 | 0.26 |
| Water | 50 | |
| Concentrated hydrochloric acid | ¹ 50 | 0.5 |
| Phosphorous acid | 82 | 1.0 |
| 37% (weight) aqueous formaldehyde | 161.4 | 2.0 |

¹ Milliliters.

PROCEDURE

The bis(2-aminoethyl)sulfide and the concentrated hydrochloric acid were charged into a flask containing the water. The phosphorous acid was then added slowly. After all the acid was added, the resulting medium was refluxed at approximately 90° C. in an oil bath. The formaldehyde was added slowly to the refluxing medium over a period of an hour. The medium was then heated under refluxing conditions for approximately 4 hours.

The reaction mixture was then concentrated by heating, precipitated with methanol and then separated. The concentrate was dried, redissolved in 300 ml. of water, charcoaled and then concentrated to a clear yellow and filtered. The filtrate was poured slowly into a blender and precipitated with methanol. The light yellow hygroscopic solid obtained after repeated washings with methanol was dried in vacuo at 45° C. over $P_2O_5$. The off-white fluffy material was pulverized and stored in a desiccator. The yield for the procedure was approximately 58 grams.

The compound obtained was subjected to infrared spectroscopy and its spectrum was found to be consistent with the chemical represented by the structural formula.

TEST PROCEDURES

Electrochemical determination of corrosion inhibitor effectiveness under cooling water conditions Methods described by the above title are well known in the industry. The methods offer many advantages including reproducibility of results, time saving and the capacity with modification, to measure both cathodic and anodic corrosion or, conversely, inhibition. These measurements are made by using a potentiostat (a special electronic instrument) which permits the controlled variation of the potential of a metal specimen exposed to the corrodent. By comparing certain measured quantities obtained in the presence and absence of inhibitor, the percent inhibition due to the inhibitor can be calculated. In addition, these electrochemical techniques can indicate the mechanism by which an inhibitor performs, i.e. whether the inhibitor retards the anodic metal dissolution reaction and/or retards the cathodic reaction (reduction of dissolved oxygen). Such information is usually not obtained from weight-loss measurements.

(A) Overall inhibition—anodic polarization.—In this method, the corrosion current ($i_{corr.}$) is taken as equal to the exchange current ($i_0$), obtained by extrapolating electrode potential vs. log $i$ plots of the Trafel region $$(100 \ mv > n > 50mv)$$

back to $n=0$. For the Tafel region:

(1) $\quad\quad\quad n = K_a \log i_0 + K_a \log i$ where $n$ is the overpotential, $K_a$ is a constant for the anodic process (metal dissolution), and $i$ is the current flowing through the potentiostat circuit. When $n=0$, we have (2) $\quad\quad\quad \log i_0 = \log i$ or (3) $\quad\quad\quad i_0 = i = i_{corr.}$ With $i_0$ and $i'_0$ respectively, designated as the uninhibited and inhibited corrosion rates, the percent inhibition $\epsilon$ is given as:

(4) $$\epsilon = \frac{i_0 - i'_0}{i_0}(100)$$

The values for $i_0$ and $i'_0$ obtained by graphical process of extrapolation to zero overpotential and consequent determination of $i_{corr}$ for the inhibited and uninhibited systems are then used to calculate the "Percent Overall Inhibition" by means of Equation 4 above.

(B) Cathodic inhibition.—In this method the potentiostat makes the test specimens carry only cathodic current, i.e. current due to the reduction of dissolved oxygen. For this process, the shape of the log $i$ versus potential curve is different primarily because the rate of reaction is not limited by the electrode potential but is limited by the rate at which the dissolved oxygen can diffuse to the electrode. If the inhibitor functions by retarding the reduction of oxygen, a smaller limiting oxygen diffusion current will result. In plotting the curve, the electrode potential (MV) is plotted agianst a saturated Calomel electrode, and "$i$-diff" for the inhibited and uninhibited systems are determined. These values are used in Equation 4 above to determine "Percent Cathodic Inhibition Efficiency."

In order to assure that the results obtained would closely approximate those which would be obtained from an actual cooling water sytem, a Simulated Cooling Water (SCW) is used. The water possesses the following characteristics:

Compositon, p.p.m.:
```
Ca++ as CaCO3 _____ 17/0
Mg++ as CaCO3 _____ 11/0
Cl- _____ 119.4
SO4= _____ 105.5
Cu++ _____ 0.2
Na2CO3 _____ 0
```

The water has a pH of 7.

In performing the tests a "mild steel" coupon is used as the test specimen and, of course, represents the metal structure of a conveyance means of an aqueous system.

In order to ascertain whether the compound

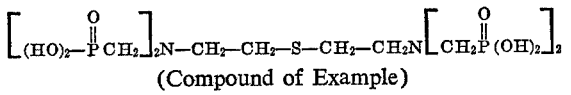

(Compound of Example)

possessed any unique qualities over closely related compounds, the following compounds were tested in the same manner to serve as comparative bases.

Compound A:

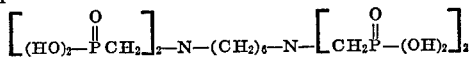

Compound B:

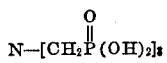

Compound C:

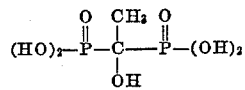

The results obtained are recorded in the following Table I.

TABLE I

| Compound | Treatment rate, i.e. p.p.m. in S.C.W. | Percentage inhibition Anodic | Cathodic |
|---|---|---|---|
| Example | 25 | 43 | 35 |
| Compound A | 25 | -36 | -5 |
| Example | 50 | 25 | 32 |
| Compound A | 50 | 15 | 0 |
| Compound B | 50 | 41 | -30 |
| Compound C | 50 | 54 | -25 |
| Example | 100 | 56 | 56 |
| Compound A | 100 | 69 | 26 |
| Compound B | 100 | 73 | 1 |
| Compound C | 100 | 71 | 13 |
| Example | 200 | 82 | 76 |
| Compound A | 200 | 72 | 72 |
| Compound B | 200 | 80 | -15 |
| Compound C | 200 | 58 | -25 |

From the foregoing tabulated results and the comparison thereof, it is apparent that the compound of the present invention (Example Compound) not only exhibited at every treatment range a "Percent Cathodic Inhibition" which was substantially superior to those obtained using the well-known compounds, but also exhibited a "Percent Anodic Inhibition" which was comparable in three treatment dosages and superior in the fourth.

The results of the foregoing test not only clearly established the effectiveness of the inventive compound as a cathodic inhibitor, but also established that the compound was effective as an anodic inhibitor. The compound, accordingly, exhibited good overall inhibitory capacity.

STANDARD TESTS

Spinner test

In order to evaluate the compound using other standard tests for corrosion inhibitors for cooling water systems, the Example Compound was tested utilizing a procedure commonly referred to as the "Spinner Test." According to this test, high carbon steel (AISI 1085) corrosion test coupons are cleaned, weighed and exposed on a rotating holder to a simulated cooling water containing the treatment in a 17 or 22 liter glass jar. The temperature of the solution is maintained at 120° F. and the pH is manually controlled. Two coupons are removed after 1 day and 2 more after 3 days. After further treating the coupons to remove corrosion products and scale, a weight loss is determined after 1 and 3 days, and a differential corrosion rate is then calculated in mils per year (m.p.y.). In addition, the surface of the coupons is inspected microscopically to determine the extent and nature of any deposits and the amount of pitting.

The Simulated Cooling Water has the following composition:

```
                                                 P.p.m.
Ca++ as CaCO3 _____ 170
Cl- _____ 119.4
Mg++ as CaCO3 _____ 110
SO4= _____ 105.5
Copper _____ 0.2
```

The solution is under constant aeration.

The mils per year loss using a dosage rate of 100 p.p.m. of the Sample Compound was an impressive 0.66 with no pitting. The Example Compound was stored for a one-month period under normal conditions and retested. Compound B was also tested at that time for comparative purposes.

Using the 100 p.p.m. treatment, the corrosion rates for both the Example Compound and Compound B were 11 to 12 mils per year. However, the coupons tested using Compound B as the inhibitor exhibited extreme pitting, while the coupons tested utilizing the Example Compound exhibited no pitting.

The foregoing was exactly the same for coupons which were tested utilizing 50 p.p.m. of the respective compounds. The corrosion rates were approximately the same, i.e. 13–14 m.p.y., but the coupons in the test water containing Compound B exhibited extreme pitting. On the other hand, the coupons contained in the test water containing the Example Compound, exhibited no deposition or pitting.

RECIRCULATING TEST

In order to fully evaluate the Example Compound, the Recirculating Testing Procedure was followed. In accordance with this test, the Simulated Cooling Water (described above) and procedure for evaluating the differential corrosion rate are identical to that used in the Spinner Test System. The corrosion test coupons are suspended from holders held in a chamber through which the simulated water was pumped at a rate of 2 ft./sec. past the metal surface. In addition, the recirculating system has a constant makeup of the new water and chemicals and blowdown. A heat transfer tube is also present in the system, allowing a study of the effect of a heat transfer surface on corrosion and scaling. It is, therefore, closer to actual field conditions than the Spinner System.

Again for comparative bases, Compound B was tested under the same conditions. The treatment dosage was 100 p.p.m. of the respective chemicals. The mils per year rates were determined as being 4.2 m.p.y. for the Example Compound and approximately 5.0 m.p.y. for Compound B. The differences were manifested by the "pitting" type corrosion which was evident from a visual inspection of the coupons subjected to the water containing Compound B. On the other hand, the coupons subjected to the water containing the Example Compound were devoid of corrosive pitting.

Modifications

It is obvious that simple modifications of the process for producing the compounds of the invention and the various ingredients are all that is required to produce derivatives of the Example Compound.

For example, the modification of the amount of phosphorous acid and aldehyde utilized will affect changes in the number of alkylenephosphonate groups present in the molecule. Minor modifications in the starting materials will provide derivatives where X represents any of the groups named, R and $R_2$ represent the groups set forth respectively for each of these designations. The discovery, of course, encompasses these derivatives since all belong to a specific family which possesses the capacity to inhibit corrosion in aqueous systems and in particular to overcome the problem of "pitting" which is commonly experienced when closely related compounds are used for this purpose. It should also be understood that the compounds of the present invention may be combined quite successfully with other well-known corrosion inhibitors or scale deposition control agents to perhaps reduce costs, reduce treatment dosage requirements, and/or obtain multifaceted treatments, i.e. produce a treatment which not only provides for corrosion inhibition, but also for the dispersion of solids in the system. In addition, the composition may contain biocidal materials to obtain control of microorganisms which would normally result in slime growth and deposition.

Combinations of the above nature would include mixtures or blends of the instant compounds with any of or mixtures of organic or inorganic phosphates, polyphosphates, e.g. sodium phosphate, sodium hexametaphosphate, tetrapotassium pyrophosphate, phosphate esters; chromates, such as sodium chromate and sodium bichromate; phosphonates, such as the Dequest series of Monsanto thiazoles, e.g. mercaptobenzothiazole; azoles, such as benzotriazole and water soluble metal salts, such as zinc salts. One particular composition which has exhibited excellent corrosion inhibition properties is composed of approximately equal parts by weight of the Example Compound (45%) and tetrapotassium pyrophosphate (55%) fed at a rate of 45 p.p.m. Moreover, the present compounds may be used in accordance with the well-known coagulants, dispersants and adsorbents, such as the natural polymers, e.g. tannins, lignins, cellulose and its derivatives, etc., the synthesized polymers, polyamids, and polyacrylamides and polyacrylates.

Since the tests performed indicated that the Example Compound also acted in the capacity of dispersant or scale formation and/or deposition inhibitor, the instant compounds can also be used in combination with biocidally active materials, such as methylene bisthiocyanate, beta-bromo-beta-nitro-styrene, the chlorophenols, etc. to produce biocidal active dispersants which can be used to control both scale and slime formations in aqueous systems.

What we claim is:

1. A process for controlling the corrosion of metal parts in contact with an aqueous system which comprises feeding into the water system an effective amount for the purpose of a compound having the formula

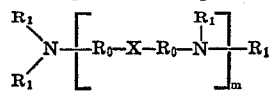

where X is S, $S_2$, SO, $SO_2$ or O;

where $R_0$ is selected from the group consisting of arylene, lower alkyl substituted arylene, halogenated arylene, sulfonated arylene and nitrated arylene and the group

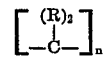

where R is selected from the group consisting of hydrogen and lower alkyls having from 1 to 6 carbon atoms, and $n$ is an integer of from 1 to 14;

where $R_1$ is selected from the group consisting of hydrogen, lower alkyl having from 1 to 6 carbon atoms, aryl and

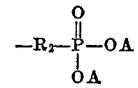

where $R_2$ is a lower alkylene or a lower alkyl substituted lower alkylene, and where A is an organic or inorganic cation; and where "$m$" is an integer of from 1 to 10; with the proviso that at least one $R_1$ is

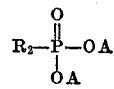

2. A process according to claim 1 where the compound is fed to the system at a rate of from about 1 to 1000 parts per million parts of said aqueous system.

3. A process according to claim 1 where the aqueous system is a cooling water system and the compound is used in combination with cooling water additives selected from the group consisting of corrosion inhibitors other than said compound, dispersants, coagulants, biocidal materials and mixtures thereof.

4. A process according to claim 1 where $R_0$ is

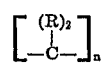

all R's are hydrogen, $R_2$ is methylene, and A is a cation selected from the group of cations of H, an alkaline earth metal, a alkali metal, ammonium and organic cations, $n$ is an integer of from 1 to 3 and $m$ is an integer of from 1 to 4.

5. A process according to claim 4 where the compound is fed to the system at a rate of from about 1 to 1000 parts per million parts of said aqueous system.

6. A process according to claim 1 where the compound possesses the formula

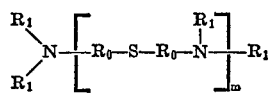

7. A process according to claim 6 where $R_0$ is

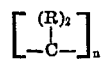

all $R_1$ groups are

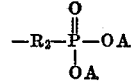

$R_2$ is methylene, A is a cation selected from the group of cations of H, alkaline earth metal, alkali metal, ammonium or organic cations, R is H, $n$ is an integer of from 1 to 3 and $m$ is an integer of 1 to 4.

8. A process according to claim 7 where the compound is fed to the system at a rate of from about 1 to 1000 parts per million parts of said aqueous system.

9. A process according to claim 7 where the compound possesses the formula

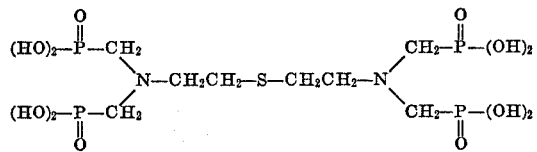

10. A process according to claim 9 where the compound is fed to the system at a rate of from about 1 to 1000 parts per million parts of said aqueous system.

11. A process according to claim 10 where the compound is fed at a rate of from about 25 to 200 parts per million parts of said aqueous system.

References Cited

UNITED STATES PATENTS

| | | | |
|---|---|---|---|
| 3,133,787 | 5/1964 | Kelley | 21—2.7 |
| 3,298,956 | 1/1967 | Irani et al. | |
| 3,303,139 | 2/1967 | Blaser et al. | |
| 3,316,331 | 4/1967 | Sims | 252—389 A X |
| 3,483,133 | 12/1969 | Hatch et al. | 252—389 A |
| 3,510,436 | 5/1970 | Silverstein et al. | 21—2.7 X |
| 3,579,444 | 5/1971 | Kerst | 21—2.7 X |
| 3,600,470 | 8/1971 | Lewis | 252—389 A X |
| 3,619,427 | 11/1971 | Kautsky | 21—2.7 X |
| 3,630,938 | 12/1971 | Troscinski | 21—2.7 X |
| 3,668,138 | 6/1972 | Hoover et al. | 21—2.7 X |

BARRY S. RICHMAN, Primary Examiner

U.S. Cl. X.R.

252—389 A